United States Patent
Huang

(10) Patent No.: US 8,902,376 B2
(45) Date of Patent: Dec. 2, 2014

(54) BACKLIGHT MODULE AND DISPLAY DEVICE USING THE SAME

(75) Inventor: Sheng-Pai Huang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 203 days.

(21) Appl. No.: 13/569,188

(22) Filed: Aug. 8, 2012

(65) Prior Publication Data

US 2013/0222735 A1    Aug. 29, 2013

(30) Foreign Application Priority Data

Feb. 24, 2012  (TW) .............................. 101106405 A

(51) Int. Cl.
*G02F 1/1333* (2006.01)
(52) U.S. Cl.
USPC ........................................................... 349/58
(58) Field of Classification Search
CPC ............................................... G02F 1/133308
USPC ........................................................... 349/58
See application file for complete search history.

(56) References Cited

U.S. PATENT DOCUMENTS

| 2006/0103776 A1* | 5/2006 | Park ................................. 349/58 |
| 2008/0192481 A1 | 8/2008 | Laney |
| 2008/0192482 A1 | 8/2008 | Laney |
| 2008/0192503 A1 | 8/2008 | Laney |
| 2009/0033827 A1* | 2/2009 | Chen et al. ...................... 349/58 |
| 2012/0170250 A1 | 7/2012 | Huang |

FOREIGN PATENT DOCUMENTS

| CN | 20081213484.2 | 9/2008 |
| TW | 200902321 | 1/2009 |
| TW | I349144 | 9/2011 |

OTHER PUBLICATIONS

TW Application serial No. 100142402, filed on Nov. 18, 2011.
SIPO First Notice of Opinion on Examination for Chinese patent application No. 201210159675.1 mailed on Jul. 31, 2013.

* cited by examiner

*Primary Examiner* — Lucy Chien
(74) *Attorney, Agent, or Firm* — Ding Yu Tan

(57) ABSTRACT

A backlight module includes a frame, at least one optical film and a flexible fixing-element. The frame includes a bottom plate and a sidewall connected to the bottom plate. The frame has an inner surface and an outer surface. The inner surface has an accommodation fillister. The frame further has a hole disposed between the accommodation fillister and the bottom plate and configured to connect the inner and outer surfaces to each other. The optical film(s) is disposed in the frame and includes a main body and a lug. The lug is inserted in the accommodation fillister and has a first opening. The flexible fixing-element has a first end and a second end. The flexible fixing-element is suitable to pass through the hole and the first opening. The first end of the flexible fixing-element is fixed on the outer surface. A display device adopting the backlight module is also provided.

26 Claims, 5 Drawing Sheets

BACKLIGHT MODULE AND DISPLAY DEVICE USING THE SAME

TECHNICAL FIELD

The present disclosure relates to a light source module, and more particularly to a backlight module and a display device using the same.

BACKGROUND

In recent years, because of the environment protection concern, liquid crystal display (LCD), due to having advantages such as higher quality, better space utilization efficiency, lower power consumption and emitting no radiation, has become one of the mainstream products in the display industry. Basically, a liquid crystal display is constituted by a LCD panel and a backlight module; wherein, the backlight module is configured to provide light to the LCD panel, and accordingly the LCD panel can display a desired image.

In general, the backlight module includes a light source, a reflective film, a variety of optical films (for example, diffusion film, prism sheet, etc.) and a frame. FIG. 1A is a schematic view of an optical film in a conventional backlight module. FIG. 1B is a schematic partial cross-sectional view of the conventional backlight module assembled with the optical film shown in FIG. 1A. It is to be noted that FIG. 1B only illustrates a portion of the conventional backlight module 100 which includes a back plate 110, a frame 120 and an optical film 130. The back plate 110 includes a positioning part 112; the optical film 130 includes a lug 132 with a positioning hole 131; wherein the positioning hole 131 of the lug 132 is corresponding to the positioning part 112 of the back plate 110. As shown, by inserting the positioning part 112 of the back plate 110 through the positioning hole 131 of the lug 132, the optical film 130 can only obtain a limited amount of horizontal movement relative to the back plate 110. In addition, the optical film 130 can also obtain a limited amount of vertical movement relative to the back plate 110 through being fixed between the frame 120 and the back plate 110. As such, the optical film 130 is prevented from separating from the back plate 110.

Conventionally, the positioning part 112 is either a copper pillar buried in the back plate 110 or an accordion-shaped wall formed on the back plate 110. If the positioning part 112 is a copper pillar, the process of burring a copper pillar in the back plate 110 is not only time consuming and costly, moreover, the optical film 130 may be damaged by a single-point force while being assembled to the copper pillar. Alternatively, if the positioning part 112 is an accordion-shaped wall, a reserved space allowance is required and accordingly it is difficult to properly bend the positioning part 112 according to the position and aperture of the positioning hole 131 of the optical film 130; and thus, dust issue may consequently occur.

Moreover, the positioning part 112 can only prevent the optical film 130 from having a horizontal movement relative to the back plate 110; in other words, the positioning part 112 must be used with the frame 120 so as to prevent the optical film 130 from obtaining a vertical movement. Because using the positioning part 112 to prevent the optical film 130 from having a horizontal as well as vertical movement, the backlight module 100 accordingly has a larger thickness, and consequently, the display device adopting this backlight module 100 cannot have a compact size and a slimmer frame.

SUMMARY

One object of the present disclosure is to provide a backlight module having a shorter production time and a lower production cost.

Another object of the present disclosure is to provide a display device having a compact size and a slimmer frame.

The disclosure provides a backlight module, which includes a frame, at least one optical film and a flexible fixing-element. The frame includes a bottom plate and a sidewall connected to the bottom plate. The frame has an inner surface and an outer surface. The inner surface has an accommodation fillister. The frame further has a hole disposed between the accommodation fillister and the bottom plate and configured to connect the inner and outer surfaces to each other. The optical film(s) is disposed in the frame and includes a main body and a lug. The lug is inserted in the accommodation fillister and has a first opening. The flexible fixing-element has a first end and a second end. The flexible fixing-element is suitable to pass through the hole and the first opening. The first end of the flexible fixing-element is fixed on the outer surface.

The disclosure further provides a display device includes the aforementioned backlight module and a display panel. The display panel is disposed on the frame.

To sum up, in the backlight module according to the present disclosure, an optical film is fixed to a frame through a flexible fixing-element. Because the flexible fixing-element has a relatively simple assembly process and can be made by film material without molds, the associated backlight module accordingly can have a shorter assembly time and a lower production cost. Moreover, because the flexible fixing-element according to the present disclosure has, compared with other conventional fixing-elements, a relatively smaller thickness, the associated backlight module can have a reduced overall thickness and consequently the display device using the backlight module can have a compact size and a slimmer frame.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

The following embodiments are exemplified by a backlight module used in a display device; however, it is not intended to limit the applications of the backlight module of the present disclosure.

Figure 1A:
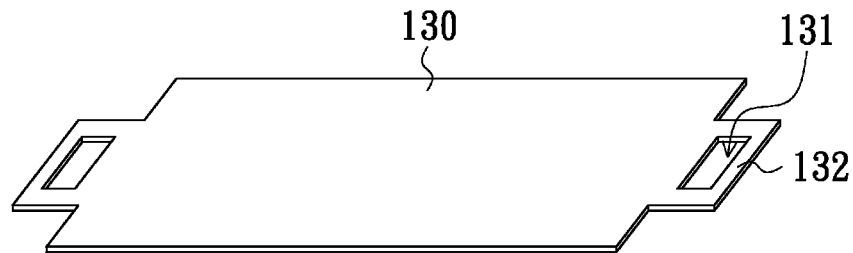
FIG. 1A is a schematic view of an optical film in a conventional backlight module.
Figure 1B:
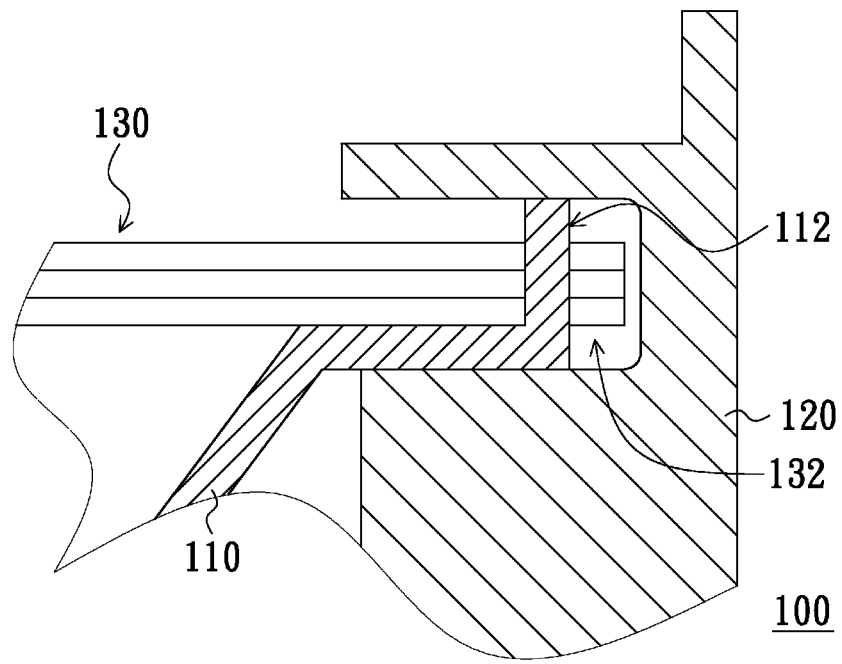
FIG. 1B is a schematic partial cross-sectional view of a conventional backlight module.
Figure 2:
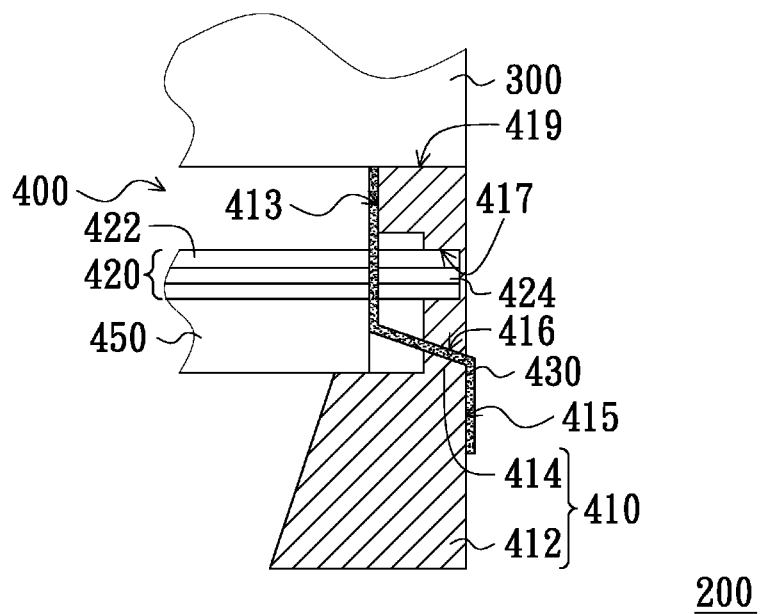
FIG. 2 is a schematic partial cross-sectional view of a display device in accordance with an embodiment of the present disclosure.

FIG. 2 is a schematic partial cross-sectional view of a display device in accordance with an embodiment of the present disclosure. As shown, the display device 200 includes a display panel 300 and a backlight module 400; wherein the display panel 300 is disposed on the backlight module 400. In this embodiment, the display panel 300 is, for example, a liquid crystal display (LCD) panel or other types of non-self-luminous display panel. The backlight module 400 is, for example, a direct-type backlight module.

The backlight module 400 includes a frame 410, at least one optical film 420 and a flexible fixing-element 430. The frame 410 includes a bottom plate 412 and a sidewall 414; wherein the sidewall 414 and the bottom plate 412 are connected to each other. The frame 410 has an inner surface 413 and an outer surface 415; wherein the inner surface 413 corresponding to the sidewall 414 has an accommodation fillister 417. In addition, the frame 410 further has a hole 416, which is disposed between the accommodation fillister 417 and the bottom plate 412 and configured to connect the inner surface 413 and the outer surface 415 to each other.

Figure 3:
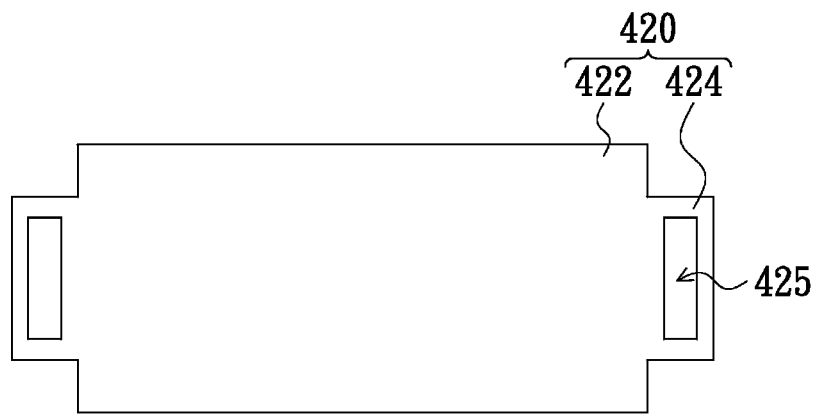
FIG. 3 is a schematic front view of the optical film in FIG. 2.

FIG. 3 is a schematic front view of the optical film 420 in FIG. 2. Please refer to FIGS. 2, 3 both. The optical film 420 is configured to be disposed in the frame 410 and includes a main body 422 and a lug 424. The lug 424 is configured to be inserted into the accommodation fillister 417 of the frame 410. In addition, the lug 424 has a first opening (or, a positioning hole) 425. It is to be noted that the optical film 420 may have a plurality of lugs 424 arranged on a same side, two adjacent sides or two opposite sides of the main body 422; and the number and position of the lug(s) 424 can be adjusted based on an actual requirement. In this embodiment, the optical film 420 is configured to enhance the image display quality of the display device 200; wherein the optical film 420 is a homogeneous plate, a brightness enhancement film, a prism sheet or a compound film, or a combination thereof. In addition, the backlight module 400 further includes a diffusion plate 450, which is disposed between the optical film 420 and the bottom plate 412 of the frame 410.

Figure 4A:
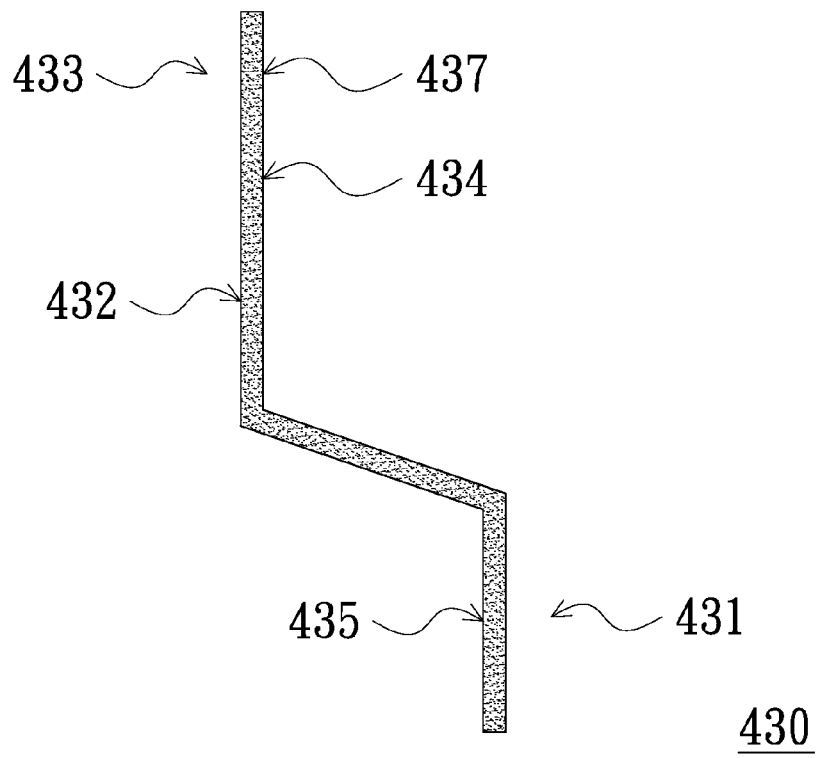
FIG. 4A is a schematic side view of the flexible fixing-element in FIG. 2.
Figure 4B:
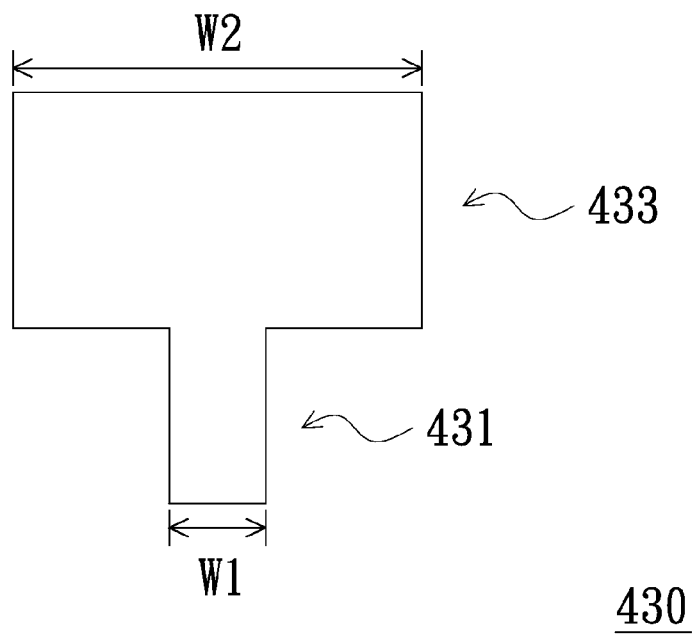
FIG. 4B is a schematic front view of the flexible fixing-element in FIG. 2.

FIG. 4A is a schematic side view of the flexible fixing-element 430 in FIG. 2. FIG. 4B is a schematic front view of the flexible fixing-element 430. Please refer to FIGS. 2, 4A and 4B. The flexible fixing-element 430 has a first end 431 and a second end 433. The flexible fixing-element 430 is capable of passing through the hole 416 of the frame 410 and the first opening 425 of the optical film 420 through the first end 431 or the second end 433 thereof. Specifically, after passing through the hole 416 of the frame 410 and the first opening 425 of the optical film 420, the flexible fixing-element 430 is configured to have the first end 431 and second end 433 thereof fixed on the outer surface 415 and the inner surface 413 of the frame 410, respectively. In this embodiment, the first end 431 of the flexible fixing-element 430 is configured to have a width W1 smaller than the width W2 of the second end 433, the aperture of the first opening 425 and the hole 416, respectively; and thus, the first end 431 of the flexible fixing-element 430 can sequentially pass through the first opening 425 and the hole 416 and then to be fixed on the outer surface 415 of the frame 410. In this embodiment, it is to be noted that the hole 416 is designed to be tilted relative to the bottom plate 412, and according to this specific structure of the hole 416, the first end 431 of the flexible fixing-element 430 can thereby pass through the first opening 425 as well as the hole 416 more easily. However, it is understood that the hole 416 can be designed to be parallel to the bottom plate 412 in another embodiment based on other design concerns.

Alternatively, in other embodiments, the width W2 of the second end 433 is configured to be smaller than the aperture of the first opening 425 and the hole 416; and thus, the second end 433 of the flexible fixing-element 430 can sequentially pass through the hole 416 and the first opening 425 and fixed on the inner surface 413 of the frame 410.

The flexible fixing-element 430 further has a first surface 432 and a second surface 434. In particular, the first end 431 having the first surface 432 includes a first bonding area 435 on the first surface 432 of the first end 431, and the first end 431 can be fixed on the outer surface 415 through (or via) the first bonding area 435. Similarly, the second end 433 having the second surface 434 includes a second bonding area 437 on the second surface 434 of the second end 433, and the second end 433 can be fixed on the inner surface 413 through the second bonding area 437.

As shown in FIG. 2, because the optical film 420 is relatively fixed to the frame 410 through the flexible fixing-element 430, the backlight module 400 in this embodiment can have, compared with a conventional backlight module, a shorter assembly time and a lower production cost. Moreover, the display device 200 adopting the backlight module 400 can have a more compact size due to the flexible fixing-element 430 able of having a thickness less than 0.2 mm if containing one or more materials of polyester films (for example, Mylar).

Figure 5:
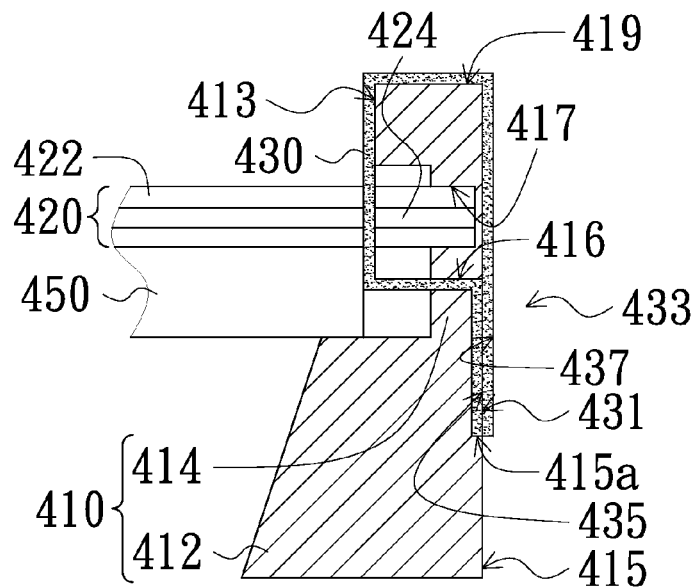
FIG. 5 is a schematic partial cross-sectional view of a backlight module in accordance with another embodiment of the present disclosure.

FIG. 5 is a schematic partial cross-sectional view of a backlight module in accordance with another embodiment of the present disclosure. As shown, the frame 410 (specifically, the sidewall 414 of the frame 410) further has a top surface 419, which is located opposite to the bottom plate 412 and connected between the inner surface 413 and the outer surface 415. In order to enhance the fixing of the optical film 420 to the frame 410, the flexible fixing-element 430 in this embodiment is configured to have its second end 433 bent around so as to wrap the top surface 419 of the sidewall 414, and then extending to the first end 431 and eventually being fixed on the outer surface 415 of the frame 410 at the sidewall 414. It is understood that the flexible fixing-element 430 in this embodiment may also have the first bonding area 435 and the second bonding area 437, and the first end 431 and the second end 433 can be fixed on the outer surface 415 through the first bonding area 435 and the second bonding area 437, respectively.

In particular, the second end 433 of the flexible fixing-element 430 in this embodiment is configured to overlap the first end 431. Moreover, the outer surface 415 of the frame 410 is designed to have a groove 415a for the accommodation of the first end 431 of the flexible fixing-element 430; thus, the second end 433 of the flexible fixing-element 430 can overlap the first end 431 more flatly. More specifically, the second end 433 of the flexible fixing-element 430 in this embodiment is configured to have a width W2 greater than the aperture of the hole 416; and thus, the hole 416 can be covered by the second end 433 of the flexible fixing-element 430 from the outer surface 415 so as to prevent the external dusts from entering inside the backlight module 400 through the hole 416 and consequently affecting the optical quality of the associated backlight module 400.

Figure 6:
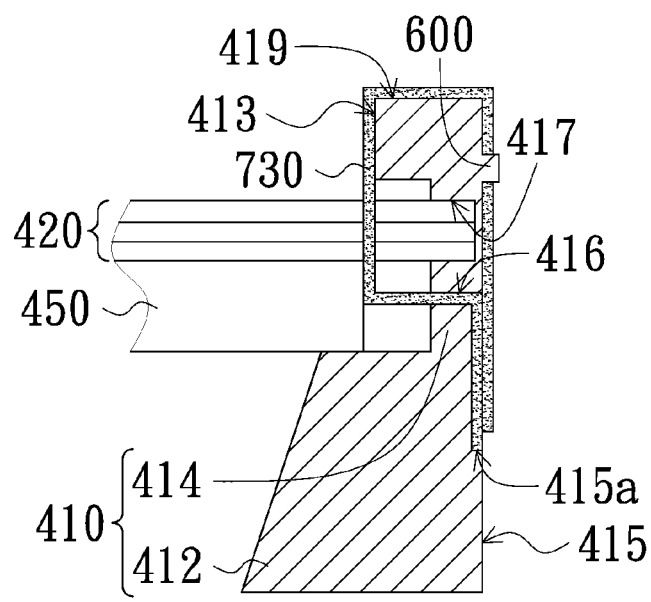
FIG. 6 is a schematic partial cross-sectional view of a backlight module in accordance with another embodiment of the present disclosure.
Figure 7:
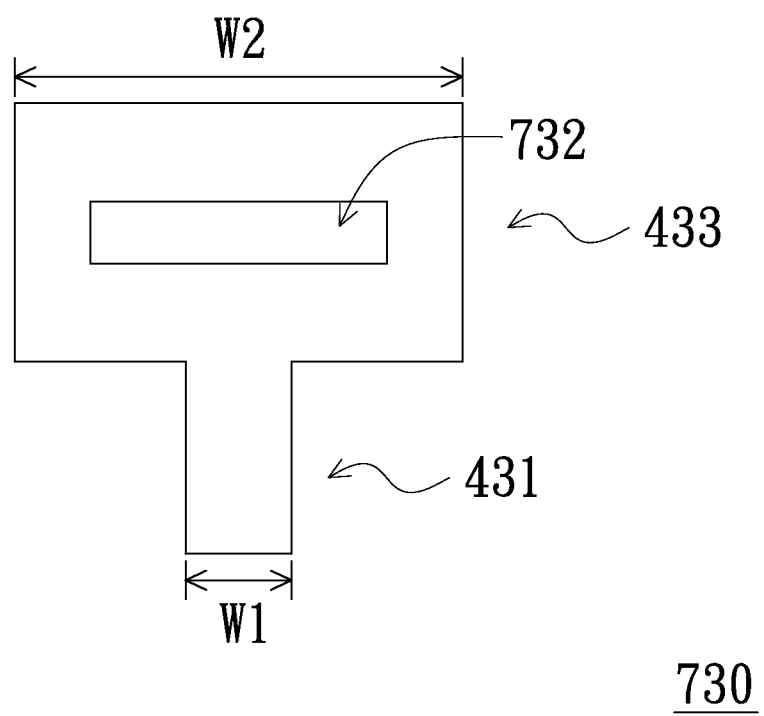
FIG. 7 is a schematic front view of a flexible fixing-element in accordance with another embodiment of the present disclosure.

Moreover, in order to dispose the flexible fixing-element 730 to an associated backlight module more precisely, in another embodiment of the present disclosure as shown in FIGS. 6 and 7, the outer surface 415 of the frame 410 corresponding to the sidewall 414 may further include a first positioning mark (for example, a convex strip 600 shown in FIG. 6) and the second end 433 of the flexible fixing-element 730 may further has a second positioning mark (for example, a second opening 732 shown in FIG. 7); wherein the convex strip 600 is corresponding to the second opening 732. As such, the assembly process of disposing the flexible fixing-element 730 to an associated backlight module can be realized by the following steps: the second end 433 of the flexible fixing-element 730 is bent so as to wrap the top surface 419 of the sidewall 414; the convex strip 600 is inserted into the second opening 732 while extending the second end 433 to the first end 431; and the second end 433 is then fixed on the outer surface 415 of the frame 410.

To sum up, in the backlight module according to the present disclosure, an optical film is fixed to a frame through a flexible fixing-element. Because the flexible fixing-element has a relatively simple assembly process and can be made by film material without molds, the associated backlight module accordingly can have a shorter assembly time and a lower production cost. Moreover, because the flexible fixing-element according to the present disclosure has, compared with other conventional fixing-elements, a relatively smaller thickness, the associated backlight module can have a reduced overall thickness and consequently the display device using the backlight module can have a compact size and a slimmer frame.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight module, comprising:
   a frame comprising a bottom plate and a sidewall connected to the bottom plate, the frame having an inner surface and an outer surface, the inner surface having an accommodation fillister, the frame further having a hole disposed between the accommodation fillister and the bottom plate and configured to connect the inner and outer surfaces to each other;
   at least an optical film disposed in the frame and comprising a main body and a lug, the lug being inserted in the accommodation fillister and having a first opening; and
   a flexible fixing-element having a first end and a second end, the flexible fixing-element being suitable to pass through the hole and the first opening, and the first end of the flexible fixing-element being fixed on the outer surface wherein the frame further has a tog surface opposite to the bottom plate and connected between the inner and outer surfaces, the flexible fixing-element is suitable to have the second end bent around so as to wrap the top surface, extended to the first end and fixed on the outer surface.

2. The backlight module according to claim 1, wherein the outer surface has a first positioning mark, the second end of the flexible fixing-element has a second positioning mark, and the first positioning mark and the second positioning mark are corresponding to each other.

3. The backlight module according to claim 2, wherein the first positioning mark is a convex strip, the second positioning mark is a second opening, and the convex strip is suitable to be inserted through the second opening.

4. The backlight module according to claim 1, wherein the flexible fixing-element has a first surface and a second surface opposite to the first surface, the first end having the first surface comprises a first bonding area on the first surface, and the first end is suitable to be fixed on the outer surface through the first bonding area.

5. The backlight module according to claim 4, wherein the frame further has a top surface opposite to the bottom plate and connected between the inner and outer surfaces, the second end having the second surface comprises a second bonding area on the second surface, the flexible fixing-element is suitable to have the second end bent around so as to wrap the top surface, extended to the first end and fixed on the outer surface through the second bonding area.

6. The backlight module according to claim 5, wherein the first and second ends overlap.

7. The backlight module according to claim 1, wherein the second end of the flexible fixing-element is fixed on the inner surface.

8. The backlight module according to claim 7, wherein the flexible fixing-element has a first surface and a second surface opposite to the first surface, the second end having the second surface comprises a second bonding area on the second surface, and the second end is suitable to be fixed on the inner surface through the second bonding area.

9. The backlight module according to claim 1, wherein the first end of the flexible fixing-element is configured to have a width smaller than that of the second end.

10. The backlight module according to claim 1, wherein the hole is covered by the second end of the flexible fixing-element.

11. The backlight module according to claim 10, wherein the second end of the flexible fixing-element is configured to have a width greater than an aperture of the hole.

12. The backlight module according to claim 1, wherein the flexible fixing-element containing one or more materials comprising of polyester films.

13. The backlight module according to claim 1, further comprising a diffusion plate disposed between the optical film(s) and the bottom plate.

14. A display device, comprising:
    a backlight module, comprising:
    a frame comprising a bottom plate and a sidewall connected to the bottom plate, the frame having an inner surface and an outer surface, the inner surface having an accommodation fillister, the frame further having a hole disposed between the accommodation fillister and the bottom plate and configured to connect the inner and outer surfaces to each other;
    at least an optical film disposed in the frame and comprising a main body and a lug, the lug being inserted in the accommodation fillister and having a first opening; and
    a flexible fixing-element having a first end and a second end, the flexible fixing-element being suitable to pass through the hole and the first opening, and the first end of the flexible fixing-element being fixed on the outer surface; and
    a display panel disposed on the frame wherein the frame further has a top surface opposite to the bottom plate and connected between the inner and outer surfaces, the flexible fixing-element is suitable to have the second end bent around so as to wrap the to surface, extended to the first end and fixed on the outer surface.

15. The display device according to claim 14, wherein the outer surface has a first positioning mark, the second end of the flexible fixing-element has a second positioning mark, and the first positioning mark and the second positioning mark are corresponding to each other.

16. The display device according to claim 15, wherein the first positioning mark is a convex strip, the second positioning mark is a second opening, and the convex strip is suitable to be inserted through the second opening.

17. The display device according to claim 14, wherein the flexible fixing-element has a first surface and a second surface opposite to the first surface, the first end having the first surface comprises a first bonding area on the first surface, and the first end is suitable to be fixed on the outer surface through the first bonding area.

18. The display device according to claim 17, wherein the frame further has a top surface opposite to the bottom plate and connected between the inner and outer surfaces, the second end having the second surface comprises a second bonding area on the second surface, the flexible fixing-element is suitable to have the second end bent around so as to wrap the top surface, extended to the first end and fixed on the outer surface through the second bonding area.

19. The display device according to claim 17, wherein the first and second ends overlap.

20. The display device according to claim 14, wherein the second end of the flexible fixing-element is fixed on the inner surface.

21. The display device according to claim 20, wherein the flexible fixing-element has a first surface and a second surface opposite to the first surface, the second end having the second surface comprises a second bonding area on the second surface, and the second end is suitable to be fixed on the inner surface through the second bonding area.

22. The display device according to claim 14, wherein the first end of the flexible fixing-element is configured to have a width smaller than that of the second end.

23. The display device according to claim 14, wherein the hole is covered by the second end of the flexible fixing-element.

24. The display device according to claim 23, wherein the second end of the flexible fixing-element is configured to have a width greater than an aperture of the hole.

25. The display device according to claim 14, wherein the flexible fixing-element containing one or more materials comprising of polyester films.

26. The display device according to claim 14, further comprising a diffusion plate disposed between the optical film(s) and the bottom plate.

* * * * *